(12) United States Patent
Jain et al.

(10) Patent No.: US 8,300,627 B2
(45) Date of Patent: Oct. 30, 2012

(54) FORWARDING ONE OR MORE PREFERENCES DURING CALL FORWARDING

(75) Inventors: Mukul Jain, San Jose, CA (US); Sanjeev Kumar, San Francisco, CA (US); Labhesh Patel, San Francisco, CA (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1480 days.

(21) Appl. No.: 11/497,968

(22) Filed: Aug. 2, 2006

(65) Prior Publication Data
US 2008/0043968 A1   Feb. 21, 2008

(51) Int. Cl.
*H04L 12/66* (2006.01)

(52) U.S. Cl. ........ 370/352; 370/356; 370/217; 370/209; 379/88; 379/211.02

(58) Field of Classification Search .......... 370/352–356; 379/211.02
See application file for complete search history.

(56) References Cited

U.S. PATENT DOCUMENTS

| | | | |
|---|---|---|---|
| 4,805,210 A | 2/1989 | Griffith, Jr. | |
| 5,432,844 A | 7/1995 | Core et al. | |
| 5,608,786 A | 3/1997 | Gordon | |
| 5,615,213 A | 3/1997 | Griefer | |
| 5,794,218 A | 8/1998 | Jennings et al. | |
| 5,937,040 A | 8/1999 | Wrede et al. | |
| 5,999,599 A | 12/1999 | Shaffer et al. | |
| 6,044,081 A | 3/2000 | Bell et al. | |
| 6,259,405 B1 | 7/2001 | Stewart et al. | |
| 6,271,764 B1 | 8/2001 | Okamura | |
| 6,373,817 B1 * | 4/2002 | Kung et al. | 370/217 |
| 6,421,544 B1 | 7/2002 | Sawada | |
| 6,438,600 B1 | 8/2002 | Greenfield et al. | |
| 6,526,293 B1 | 2/2003 | Matsuo | |
| 6,545,596 B1 | 4/2003 | Moon | |
| 6,564,261 B1 | 5/2003 | Gudjonsson et al. | |
| 6,587,680 B1 | 7/2003 | Ala-Laurila et al. | |
| 6,643,774 B1 | 11/2003 | McGarvey | |
| 6,654,455 B1 | 11/2003 | Isaka | |
| 6,769,000 B1 | 7/2004 | Akhtar et al. | |
| 6,792,296 B1 | 9/2004 | Van Bosch | |

(Continued)

OTHER PUBLICATIONS

How to Build Smart Appliances, Albercht Schmidt, Kristof Van Laerhoven, IEEE Personal Communications, Aug. 2001, pp. 66-71.

*Primary Examiner* — Asad Nawaz
*Assistant Examiner* — Khaled Kassim
(74) *Attorney, Agent, or Firm* — Baker Botts L.L.P.

(57) ABSTRACT

In one embodiment, a telephony system includes a memory that stores one or more call preferences of a user, and a central call routing entity that enables a user to set a call forwarding rule. In accordance with the call forwarding rule and in response to an incoming call to a first telephone device of the user, the call routing entity routing the incoming call to a second telephone device along with a message indicating that the one or more call preferences of the user are stored in the memory. The one or more call preferences are then fetched and applied at the second telephone device. It is emphasized that this abstract is provided to comply with the rules requiring an abstract that will allow a searcher or other reader to quickly ascertain the subject matter of the technical disclosure.

20 Claims, 3 Drawing Sheets

U.S. PATENT DOCUMENTS

| | | |
|---|---|---|
| 6,792,297 B2 | 9/2004 | Cannon et al. |
| 6,798,874 B1 | 9/2004 | Ohlinger et al. |
| 6,799,052 B2 | 9/2004 | Allegrezza et al. |
| 6,804,334 B1 | 10/2004 | Beasley et al. |
| 6,816,469 B1 | 11/2004 | Kung et al. |
| 6,839,761 B2 | 1/2005 | Kadyk et al. |
| 6,847,715 B1 | 1/2005 | Swartz |
| 6,870,835 B1 | 3/2005 | Chen et al. |
| 6,876,734 B1 | 4/2005 | Summers et al. |
| 6,891,942 B1 * | 5/2005 | Porter et al. ............. 379/211.02 |
| 6,905,414 B2 | 6/2005 | Danieli et al. |
| 6,907,123 B1 | 6/2005 | Schier |
| 6,912,275 B1 | 6/2005 | Kaplan |
| 6,917,672 B2 | 7/2005 | Brown et al. |
| 6,918,034 B1 | 7/2005 | Sengodan et al. |
| 6,931,001 B2 | 8/2005 | Deng |
| 6,934,858 B2 | 8/2005 | Woodhill |
| 6,947,417 B2 | 9/2005 | Laursen et al. |
| 6,985,745 B2 | 1/2006 | Quaid |
| 6,987,744 B2 | 1/2006 | Harrington et al. |
| 7,042,989 B2 | 5/2006 | Lawson et al. |
| 7,076,045 B2 * | 7/2006 | Gibson ................... 379/211.02 |
| 7,142,647 B2 * | 11/2006 | Askerup ...................... 379/88.2 |
| 7,227,940 B2 * | 6/2007 | Gibson ................... 379/211.02 |
| 2002/0001008 A1 | 1/2002 | Imanaka et al. |
| 2002/0068537 A1 | 6/2002 | Shim et al. |
| 2002/0086680 A1 | 7/2002 | Hunzinger |
| 2002/0178228 A1 | 11/2002 | Goldberg |
| 2002/0198004 A1 | 12/2002 | Heie et al. |
| 2003/0061496 A1 | 3/2003 | Ananda |
| 2003/0179743 A1 * | 9/2003 | Bosik et al. .................. 370/352 |
| 2004/0131206 A1 | 7/2004 | Cao et al. |
| 2004/0248586 A1 | 12/2004 | Patel et al. |
| 2005/0047564 A1 * | 3/2005 | Askerup .................... 379/88.22 |
| 2005/0157708 A1 | 7/2005 | Chun |
| 2005/0177622 A1 | 8/2005 | Spielman et al. |
| 2005/0272413 A1 | 12/2005 | Bourne |
| 2006/0034336 A1 | 2/2006 | Huh et al. |
| 2006/0045252 A1 * | 3/2006 | Gorti et al. ............... 379/201.02 |
| 2006/0079280 A1 * | 4/2006 | LaPerch ....................... 455/557 |
| 2006/0116175 A1 | 6/2006 | Chu |
| 2006/0147002 A1 * | 7/2006 | Desai et al. ............. 379/100.06 |
| 2008/0002820 A1 * | 1/2008 | Shtiegman et al. ...... 379/211.02 |

* cited by examiner

FORWARDING ONE OR MORE PREFERENCES DURING CALL FORWARDING

FIELD OF THE INVENTION

The present invention relates generally to the fields of telecommunications and telephony systems; more specifically, to telephony networks that include call management systems or advanced call processing features.

BACKGROUND OF THE INVENTION

Many telephony systems include advanced features that enhance user capabilities. For instance, "call waiting" is a well-known feature of telephony systems that notifies a caller when another call is coming in during an active call. "Caller ID" is another well-known feature that displays the originating telephone number and the subscriber's name associated with that number to the called party before the called party answers a telephone call. Still another configurable feature is "call forwarding", wherein incoming calls to a particular directory number are automatically routed to another number. A number of variations to the basic call forwarding feature also exist. By way of example, "call forward busy" is a feature that re-routes incoming calls to an alternate line only when the first line is in use. Similarly, "call forward no answer" is a configurable feature that re-routes incoming calls from one phone to another phone when the first phone is not answered after a certain number of rings.

A number of commercial communication system products are available that combine call processing and Internet Protocol (IP) telephony with many of the functions of a conventional IP-private branch exchange (PBX) system for business enterprises. For instance, Cisco's CallManager™ is a software-based call processing component that extends enterprise telephony features and functions to packet telephony network devices such as IP phones, media processing devices, voice-over-IP (VoIP) gateways, and multimedia applications. Additional data, voice, and video services such as unified messaging, multimedia conferencing, collaborative contact centers, and interactive multimedia response systems may interact with the IP telephony solution through the CallManager™ open telephony application programming interface (API). In a version of the CallManager™ call processing software, users may set various preferences on their telephone device, such as incoming call ring tones for different caller IDs and/or call priority (e.g., siren for important calls, chirp for medium priority calls, etc.), call display settings for displaying pictures or photos of a caller, etc. However, when a user forwards their calls to another telephone device these preference settings are not applied at the forwarded destination telephone device.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

A system and method that enables users to forward their call preferences, such as alerting ring tones, alerting caller ID preferences (such as display of numbers, photos etc.), and the like, to a target phone connected via the same PBX, or a different PBX, is described. In the following description specific details are set forth, such as device types, system configurations, methods, etc., in order to provide a thorough understanding of the present invention. However, persons having ordinary skill in the relevant arts will appreciate that these specific details may not be needed to practice the present invention.

Figure 1:
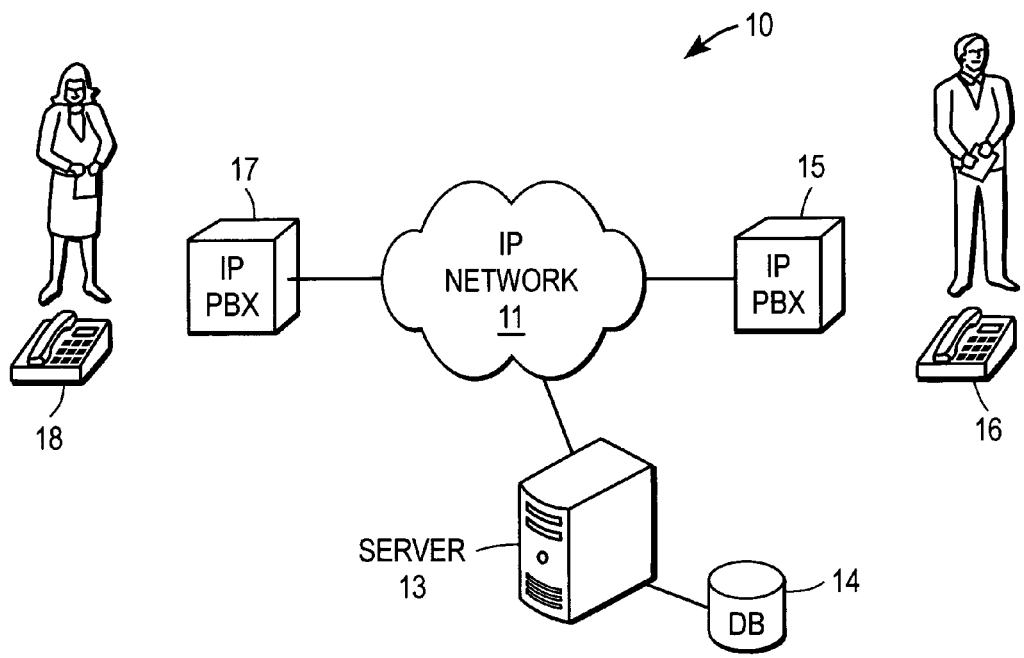
FIG. 1 is a network diagram including different IP-PBX systems in accordance with one embodiment of the present invention.

FIG. 1 is a conceptual-level diagram of a network architecture 10 that includes separate IP-PBX systems 15 & 17 connected via an IP network 11 according to one embodiment of the present invention. Each of the IP-PBX systems 15 & 17 may run call management software (CMS) or firmware program for implementing call routing, processing and other IP telephony functions described herein. A call forwarding preference repository (CFPR) 14, i.e., a memory or database that stores preferences of users, such as alerting ring tone, etc. whenever the user sets up call forwarding rule for his phone. The example of FIG. 1 shows a first user (e.g., Shelia) of telephone device 18 associated with IP-PBX 17 and a second user (e.g., Joe) of telephone device 16 associated with IP-PBX 15. CFPR 14 is shown connected to IP network 11 via a server 13.

Figure 2:
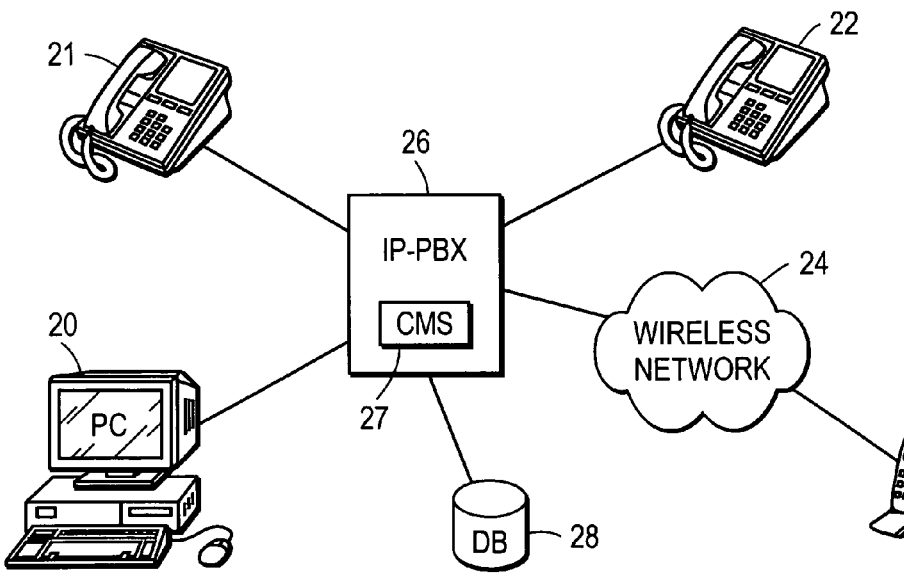
FIG. 2 is a conceptual network diagram of an IP-PBX system and wireless network in accordance with another embodiment of the present invention.

In other embodiments, CFPR 14 may be resident on each user's PBX, e.g., IP-PBX system 15 & 17, or on a single IP-PBX system that handles call management functions for an organization or enterprise. By way of example, FIG. 2 shows an IP-PBX system 26 with a CMS program 27 that handles call routing, processing and other IP telephony functions for users of telephone devices 21 & 22, a PC 20 with built-in softphone capabilities, and a cellular telephone device 23 connected with IP-PBX 26 via a wireless network 24. IP-PBX 26 is connected with a database or CFPR 28 that stores preferences of users of telephone devices 20-13; those preference including things such as alerting ring tone, display preference, priority call ring tones, etc. In the architecture of FIG. 2, an incoming call intended for any of devices 20-23 may be forwarded to another telephone device connected to IP-PBX 26 along with one or more user preferences (e.g., alerting ring tone) fetched from CFPR 28. These preferences are then immediately applied at the target telephone device.

Continuing with the examples of FIGS. 1 and 2, practitioners in the art will appreciate that in still another embodiment, user preferences may be stored in a variety of other hardware (e.g., RAM) or firmware components connected with IP network 11. In certain embodiments, user preferences may be incorporated into memory or storage components of IP-PBX system 15 and/or 17, or IP-PBX 26 in FIG. 2, or be integrated into the user preferences or profile settings typically provided for in CMS 27.

According to one embodiment of the present invention, when Joe sets up a call forwarding rule on telephone device 16 such that his calls are forwarded to Sheila's telephone device 18, all (or a selected subset) of Joe's call preferences are uploaded from CFPR 14 onto IP-PBX 15. At a later time, when IP-PBX 15 receives an incoming call to Joe's telephone device 16, IP-PBX 15 forwards that call to Sheila's telephone device 18 and includes information in the call control message indicating that user preferences for that call are stored on the forwarding PBX, i.e., IP-PBX 15.

Note that in an alternative embodiment, Joe's call preferences may be stored on his telephone device 16—rather than on CFPR 14—and uploaded to IP-PBX 15 when Joe configures his telephone device 16 with a call forwarding rule. In still another implementation, Joe's call preferences are not uploaded from CFPR 14 to IP-PBX 15 at the time that Joe configures telephone device 16 to forward calls to Shelia's telephone number. Instead, when IP-PBX 15 receives an incoming call to Joe's telephone device 16, IP-PBX 15 forwards that call to Sheila's telephone device 18 and includes information in the call control message indicating that user preferences for that call are stored on CFPR 14, which may be accessed via server 13 on IP network 11.

Regardless of where user preferences are stored, or how user preferences are uploaded and accessed, information in the call control message sent to the target (i.e., forwarded) telephone device may include instructions on how to download the user's preferences—e.g., either from the forwarding IP-PBX, CFPR 14, or elsewhere. In an alternative embodiment, the user's call preferences may be included in the call control message header with instructions regarding how to download media files such as ring tones specified in the user's preferences, pictures, photos, etc. For example, the call control message may comprise a Session Initiation Protocol (SIP) message with a SIP header field that includes a Uniform Resource Locator (URL) with authentication information for downloading media files. This latter embodiment is described in more detail later below.

When Sheila's telephone device 18 receives the forwarded call intended for Joe, it fetches Joe's call preferences along with any media files for ring tones according to instructions/information received and then applies those preferences to the current call. For example, Joe's user preferences may specify that a traditional Italian song or melody is played as a ring tone for his calls, whereas Sheila's usual ring tone may consist of the start of Beethoven's Fifth symphony. As a result, when a call forwarded from Joe's telephone device 16 rings on Sheila's telephone device 18, it does so with an alerting ring tone specified by Joe's user preferences (e.g., the traditional Italian song). Thus, the specific alerting ring tone that Sheila and Joe both hear allows each of them to immediately identify the intended recipient of the current call.

As discussed above, a variety of different network architecture configurations and specific implementations may be utilized to achieve forwarding of user preferences in conjunction with forwarding of that user's calls. For instance, in another embodiment, when Joe sets up his call forwarding rule to forward his calls to Sheila's telephone device 18, his call preferences are immediately sent directly to Sheila's telephone device 18 along with instructions on downloading any media files for ring tones. In response to the instructions Sheila's telephone device 18 may fetch Joe's call preferences and save them locally along with any media files downloaded either from Joe's telephone device 16, CFPR 14, or elsewhere. Thereafter, any time when IP-PBX 15 forwards an incoming call intended for Joe to Sheila's telephone device 18, IP-PBX 15 may include information (e.g., contained in a call control message header) identifying the call as such. In response, Sheila's telephone device 18 retrieves Joe's user preferences stored locally and applies those preferences (e.g., a traditional Italian song for the alerting ring tone) for handling the forwarded call intended for Joe.

In a more specific embodiment, Sheila's telephone device 18 may ask her permission before saving Joe's user preferences and media files locally. In still another embodiment, Sheila's telephone device 18 includes software or firmware that permits her to set up rules specific to the handling of forwarded calls. For instance, she may configure telephone device 18 such that telephone device 18 only saves user preferences for forwarded calls locally, but does not immediately fetch and download media files (e.g., ring tone) specified by the user preferences. Instead, telephone device 18 fetches and downloads media files (e.g., from a repository server) for the user preferences at the time it receives a forwarded call.

In instances where Sheila's phone already has the ring tone specified in Joe's forwarded preferences stored locally, it simply plays that ring tone when a forwarded call intended for Joe arrives. In a case where Sheila's telephone device 18 attempts to download a ring tone or media file from a server and is unsuccessful, telephone device 18 may utilize a default ring tone when a forwarded call for Joe arrives.

In yet another embodiment, the forwarding of preferences is transitive. In other words, preferences are carried forward along with the call regardless of how many times the call gets forwarded. By way of example, if Joe forwards his incoming calls to Sheila's telephone, and then from Sheila's device Joe later forwards his calls to Bob's telephone, then Bob's telephone device would receive (or fetch) Joe's user preferences and apply them to the forwarded call.

It should be understood that the various embodiments of the present invention described herein are not limited to the user of VoIP telephone devices or networks. Any telephone device or network capable of packet-based message transmission may be utilized in conjunction with the present invention. For instance, telephone devices and networks compatible with the Integrated Services Digital Network (ISDN) standard may be utilized in certain embodiments. Similarly, the network configurations, systems, and methods described herein in accordance with different embodiments are not limited to the use of IP-PBX systems. Any central call routing entity, such as a PBX, cellular network, service provider network, etc., may be adapted or modified to implement the functions and capabilities described herein.

Figure 3:
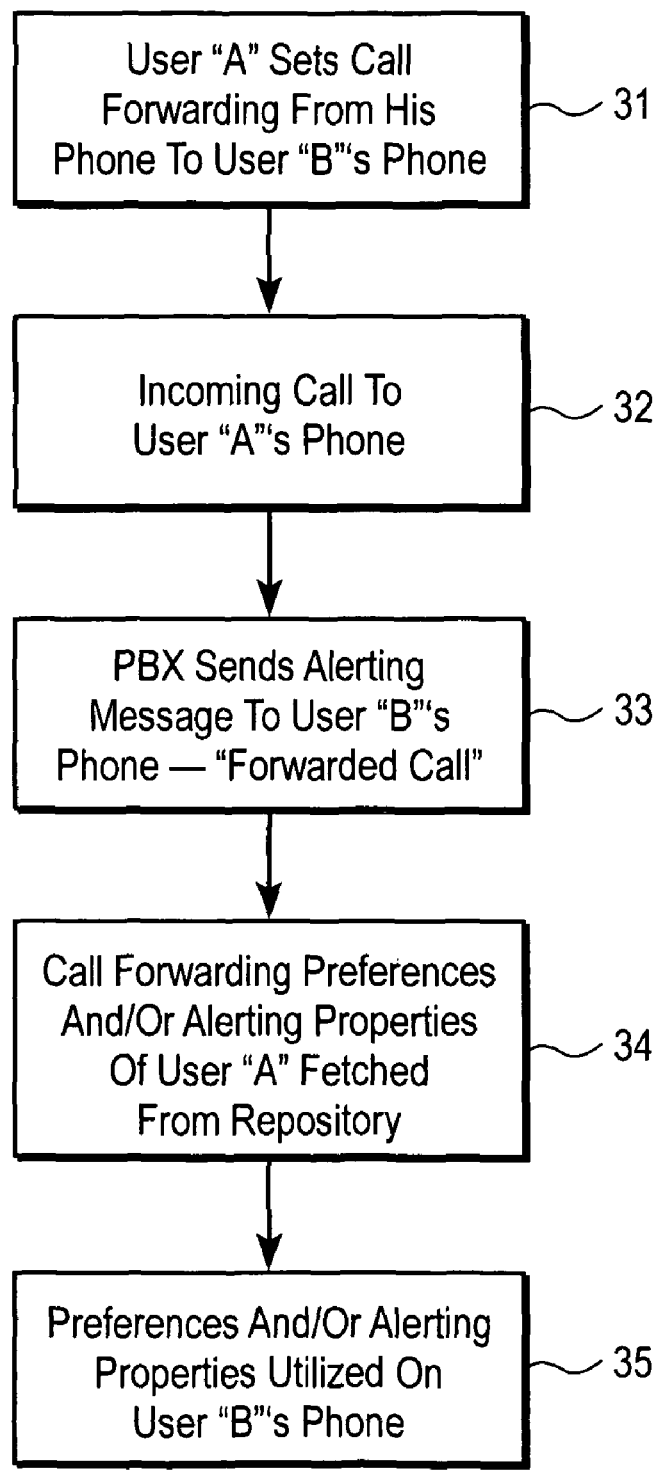
FIG. 3 is a flowchart diagram that illustrates a method of operation according to one embodiment of the present invention.

FIG. 3 is a flowchart diagram that illustrates a basic method of operation according to one embodiment of the present invention. The process begins with user "A" setting up call forwarding on his telephone device so that his incoming calls are forwarded to user "B" (block 31). Thereafter, when an incoming call arrives at the PBX system to user "A's" telephone (block 32), the PBX system sends an alerting message to user "B's" telephone device that this is a forwarded call (block 33). In response to the alerting message user "B's" telephone device fetches user "A's" preferences from a central repository (block 34). As explained earlier, the central repository may comprise any storage location, memory, or database located anywhere that is accessible to the forwarded telephone device. In certain implementations, user preferences may be fetched and cached locally in a storage location on the user's telephone device. In such as case, user "B's" telephone device would first check its cache to determine whether a copy of user "A's" preferences are stored locally before proceeding to fetch those preferences from an external location/entity.

Once user "B's" telephone device obtains (e.g., downloads) user "A's" preferences, those preferences are utilized or applied to the forwarded call on user "B's" telephone device (block 35). In other words, according to the embodiment of FIG. 3 the preferences or properties are fetched dynamically—e.g., when call alerting occurs—and then utilized or applied to the forwarded call. For example, if user "A's" preferences include a certain song as an alerting ring tone, that song will be played on user "B's" telephone device rather than user "B's" normal or preset alerting ring tone. Other common user preferences include specific sounds or tones (e.g., siren, chirp, etc.) for indicating call priority levels, photos or video clips displayed on the telephone device (e.g., a photograph or captured image of the incoming caller), etc.

Figure 4:
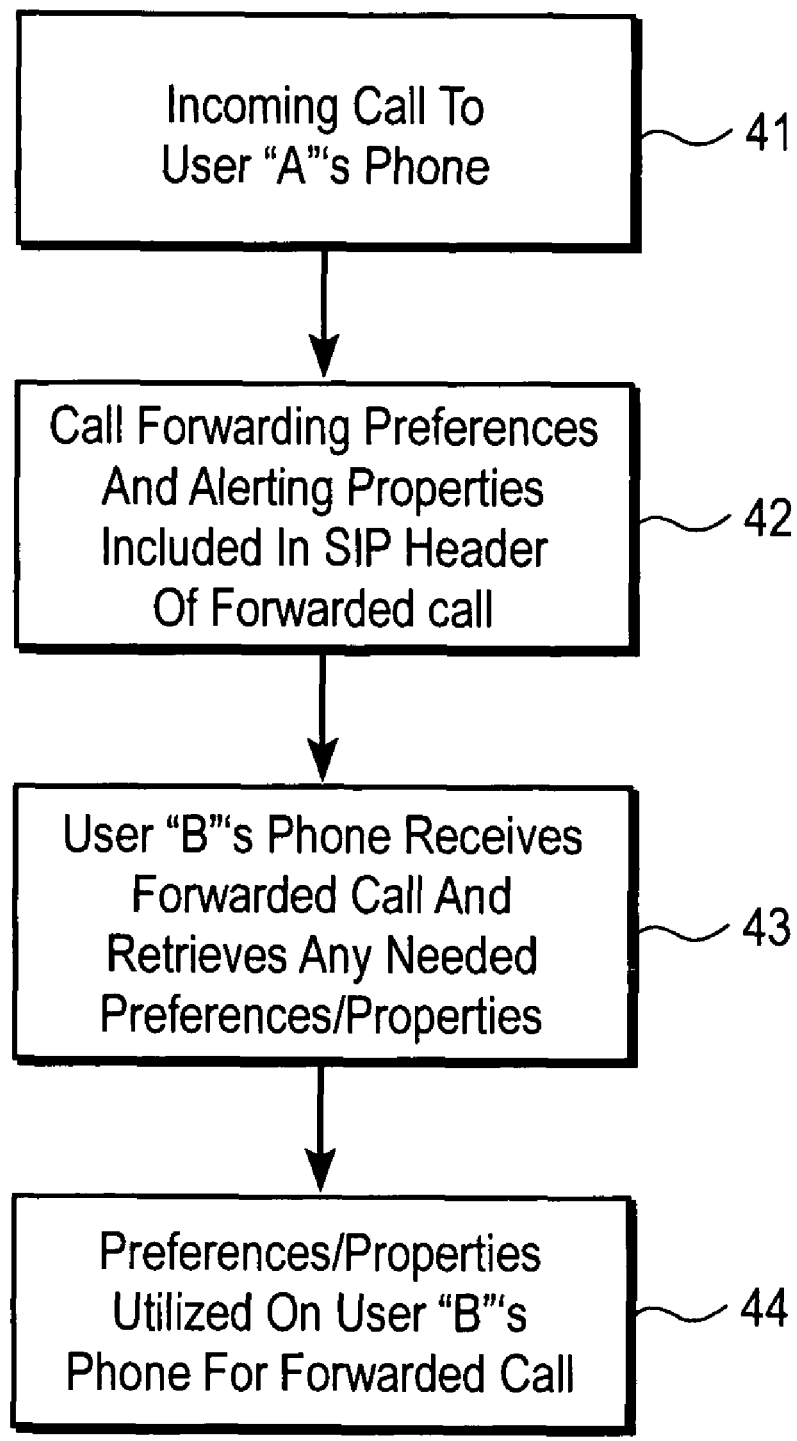
FIG. 4 is a flowchart diagram that illustrates a method of operation according to another embodiment of the present invention.

FIG. 4 is a flowchart diagram that illustrates a method of operation according to another embodiment of the present invention in which both user's telephone devices are SIP endpoint devices. The example of FIG. 4 begins at block 41 with an incoming call to user "A's" telephone device (received by the local PBX system). After the call arrives and before any telephone device is alerted, the PBX system embeds user "A's" preferences (e.g., call alerting properties, etc.) in a SIP message header that is sent to user "B's" telephone device along with the forwarded call (block 42). In other words, as calls to user "A's" endpoint device are forwarded to user "A's" endpoint device, user "A's" preferences pertaining to common capabilities on both devices are transferred as well. By way of example, the SIP message header may comprise a SIP INVITE message, a SIP Call-History message, or a SIP Diversion header field that is commonly used to enable call control redirection. Additional tags in the message or header may contain a URL link to the relevant media files.

In certain implementations, the SIP message header may also include the specific ring tone or media files to be applied/played on user "B's" telephone. In instances where the SIP header does not contain the ring tone or other media files specified in user "A's" preferences, and user "B's" telephone device similarly does not have the specified ring tone or media files stored locally, user "B's" telephone device may download the needed ring tone/media files from another entity, e.g., the PBX system, central repository, etc. (block 43). In still another embodiment, where user "B's" telephone device is missing some capabilities as compared to user "A's" telephone device, then user "A" is informed of the missing capabilities that could not be transferred. Conversely, in cases where user "B's" telephone device has additional capabilities over user "A's" telephone device, then user "A" may be informed of those additional capabilities and be allowed to set up his preferences to take advantage of those capabilities at the time that he sets up his call forwarding.

Once the preferences/properties have been received or obtained, they are utilized or applied to the forwarded call on user "B's" telephone device (block 44).

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A system comprising:
    a memory that stores one or more call preferences of a user, the one or more call preferences including a specific ring tone for use in alerting an incoming call intended for the user;
    a call routing entity operable to receive a request from the user to forward the incoming call from a first endpoint device associated with the user to a second endpoint device associated with a different user, to cause the one or more call preferences of the user to be communicated to the second endpoint device, and to apply the one or more call preferences at the second endpoint device to the incoming call—forwarded to the second endpoint device, application of the one or more call preferences causing the specific ring tone to be used at the second endpoint device to alert of the incoming call.

2. The system of claim 1 wherein the second endpoint device fetches the one or more call preferences from the memory and applies the one or more call preferences to the forwarded calls responsive to the request.

3. The system of claim 1 wherein the call routing entity comprises an Internet Protocol private branch exchange (IP-PBX).

4. The system of claim 1 wherein the memory comprises a repository that stores call preferences of a plurality of users.

5. The system of claim 1 wherein the specific ring tone comprises a priority call ring tone.

6. The system of claim 1 wherein the request comprises a call control message call control message sent to the second endpoint device, the call control message including instructions regarding downloading of the one or more call preferences.

7. A non-transitory computer-readable storage medium encoded with a computer program, which when executed, is operable to:
    receive an incoming call intended for a user at a routing entity, the incoming call being directed to a first telephone device associated with the user; and
    route the incoming call to a second telephone device associated with a different user along with a call control message which includes information that enables the second telephone device to apply one or more call alerting preferences stored in a memory of the user to the incoming call, the one or more call alerting preferences including a specific ring tone, application of the one or more call alerting preferences causing the specific ring tone to be used at the second endpoint device to alert of the incoming call.

8. The non-transitory computer-readable storage medium of claim 7 wherein the one or more call alerting preferences further includes a display preference.

9. The non-transitory computer-readable storage medium of claim 7 wherein the computer program, when executed, is further operable to fetch the one or more call alerting preferences from a central repository.

10. The non-transitory computer-readable storage medium of claim 7 wherein the one or more call alerting preferences specify one or more media files, the information including instructions regarding how to access media files.

11. The non-transitory computer-readable storage medium of claim 7 wherein the call control message comprises a Session Initiation Protocol (SIP) message.

12. A processor-implemented method of operation for an Internet Protocol private branch exchange (IP-PBX) system comprising:
 receiving a request from a user to forward an incoming call intended for a first endpoint associated with the user to a second endpoint associated with a different user;
 accessing one or more call preferences of the user, the one or more call preferences being stored in a memory and including a specific ring tone and/or a display preference; and
 communicating the one or more of the call preferences to the second endpoint to apply the one or more call preferences at the second endpoint to the incoming call forwarded to the second endpoint, application of the one or more call preferences causing the specific ring tone to be used at the second endpoint device to alert of the incoming call.

13. The processor-implemented method of claim 12 wherein the communicating step comprises automatically routing the incoming call to the second endpoint upon arrival at the IP-PBX system.

14. The processor-implemented method of claim 12 wherein the communicating step comprises embedding the one or more call preferences in a message header.

15. The processor-implemented method of claim 12 wherein the accessing step comprises fetching the one or more call preferences from a central repository.

16. The processor-implemented method of claim 12 wherein the one or more call alerting preferences specify one or more media files, the information including instructions regarding how to access the one or more media files.

17. The processor-implemented method of claim 14 wherein the message header comprises a Session initiation Protocol (SIP) message header.

18. The processor-implemented method of claim 12 wherein the second telephone device is associated with a different PBX.

19. The processor-implemented method of claim 17 wherein the SIP message header includes a Uniform Resource Locator (URL) with authentication information for downloading media files.

20. A system comprising:
 a memory that stores one or more call alerting preferences of a user, the one or more call alerting preferences including a specific ring tone;
 means for receiving a request from the user to forward calls for a first endpoint device associated with the user to a second endpoint device associated with a different user, means for accessing one or more call alerting preferences of the user, and means for communicating the one or more call alerting preferences to the second endpoint device to apply the one or more call alerting preferences at the second endpoint device to calls intended for the user that have been forwarded to the second endpoint device.

* * * * *